United States Patent
Silva et al.

(10) Patent No.: US 11,100,766 B2
(45) Date of Patent: Aug. 24, 2021

(54) CASH DRAWER DETECTION AND CONTROL

(71) Applicant: NCR Corporation, Atlanta, GA (US)

(72) Inventors: Sergio Silva, Atlanta, GA (US); John Crooks, Duluth, GA (US); Andrew Klenzak, Atlanta, GA (US); Lawrence Garcia Lim, Cebu (PH); Eric Robert Thoroe, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/667,296

(22) Filed: Oct. 29, 2019

(65) Prior Publication Data

US 2021/0125466 A1 Apr. 29, 2021

(51) Int. Cl.
*G07G 1/00* (2006.01)
*G07G 1/12* (2006.01)
*G07G 1/01* (2006.01)

(52) U.S. Cl.
CPC ............ *G07G 1/0027* (2013.01); *G07G 1/01* (2013.01); *G07G 1/12* (2013.01)

(58) Field of Classification Search
CPC .......... G07G 1/0027; G07G 1/12; G07G 1/01
See application file for complete search history.

(56) References Cited

U.S. PATENT DOCUMENTS

| | | | |
|---|---|---|---|
| 2010/0171627 A1* | 7/2010 | Takizawa | G07G 1/0027 340/665 |
| 2016/0224084 A1* | 8/2016 | Jimbo | G07G 5/00 |
| 2016/0364710 A1* | 12/2016 | Kim | G07G 1/12 |

* cited by examiner

*Primary Examiner* — Sonji N Johnson
(74) *Attorney, Agent, or Firm* — Schwegman, Lundberg & Woessner (57) ABSTRACT

Systems and methods for cash drawer detection and control are disclosed herein. The systems and methods may include use of an adaptor. The adaptor may connect a cash drawer to a point of sale (POS) terminal. The adaptor may include allow for an input signal to be received from the cash drawer. The type of cash drawer can be identified based on the input signal. An output signal operative to open the cash drawer can be generated and transmitted to the cash drawer to open the cash drawer.

18 Claims, 4 Drawing Sheets

CASH DRAWER DETECTION AND CONTROL

SUMMARY

Systems and methods for cash drawer detection and control are disclosed herein. The systems and methods may include use of an adaptor. The adaptor may connect a cash drawer to a point of sale (POS) terminal. The adaptor may include allow for an input signal to be received from the cash drawer. The type of cash drawer can be identified based on the input signal. An output signal operative to open the cash drawer can be generated and transmitted to the cash drawer to open the cash drawer.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Traditional point of sale (POS) terminals have a fixed configuration circuit that does not allow for future use of cash drawers that do not conform to the same configuration that was supported by the POS terminal at the time of design and manufacture. Stated another way, the design and implementation of hardware in traditional POS terminals is static and depends on the discrete resistors and op-amp components used in traditional POS terminals. This static/fixed nature of traditional POS circuit design prevents cash drawers that do not conform to voltage levels, or a combination of different types of cash drawers, from being used with that the traditional fixed circuit design.

As disclosed herein, cash drawers used with point of sale (POS) terminals may use a cash drawer kick out (CDKO) circuit. The CDKO circuit can include a combination of digital inputs/outputs and analog inputs/outputs to detect cash drawer states, operational voltage, and control when the cash drawer is opened, sometimes referred to as kicking the cash drawer. For example, a POS terminal may support two cash drawers, either via two ports, or a single port with an adapter as disclosed herein.

The cash drawer physical state (e.g., open/closed) and operational voltage (e.g., 12V, 24V, or some other voltage) inputs may be analog signals, whose voltages indicate a specific configuration. In the CDKO circuit, there may be comparator circuits that determine the voltages of these analog signals and produce digital signals which are sent back to a System-on-Chip (SOC or other systems) to indicate that specific cash drawer configuration.

As disclosed herein an adaptor may include a hardware circuit and embedded firmware. This hardware circuit and embedded firmware may be on a peripheral input/output (I/O) board located inside the POS cabinet, inside the cash drawer, or as a separate adaptor that can be connected to a cable connecting the POS terminal to the cash drawer. The hardware circuit and embedded firmware may be connected via ports on the POS terminal and cash drawer. For example, the adaptor may be connected using a USB-C connection. Still consistent with embodiments disclosed herein, the adaptor's hardware circuit and embedded firmware may be part of a motherboard of the POS terminal or mounted inside the cash drawer.

As disclosed herein, a micro controller can be incorporated into a CDKO circuit. The microcontroller may contain an internal Analog-to-Digital Converter (ADC) and a Pulse Width Modulation (PWM) peripheral, which allows for a discrete comparator and PWM-related parts of a traditional CDKO circuit to be removed. In other words, the adaptors and other systems disclosed here do not have discrete comparators and PWM related parts.

The connections from the physical cash drawer may be ports, such as RJ-XX (e.g., RJ-45, or RJ-12) ports, that are connected to the microcontroller. Analog signals, which indicate whether the cash drawer is open or closed and whether the cash drawer operates via 12 or 24-volts, may be connected to analog inputs on the microcontroller. The analog signals may be analyzed and converted into digital values by an ADC peripheral connected to or integrated into the microcontroller. The microcontroller can analyze the converted digital values to alter the pulse width of the PWM peripheral, which will in turn, drive either 12 or 24 volts to power the cash drawer when it is being opened. Thus, digital signals produced by the microcontroller can control when the cash drawer is opened.

Using the adaptor disclosed herein, all physical cash drawer connections will now be contained between the cash drawer ports and the microcontroller. The only signals transmitted back to the main system (i.e., the POS terminal's motherboard) are the USB interface D+/D− lines. The microcontroller can receive and provide information to the POS terminal via a USB interface, such as a USB-C connection.

Using an ADC peripheral introduces a finer level of granularity to analog voltage detection. Because of this, cash drawer configurations can be adaptive, changing the operational voltage produced by the circuit based on which cash drawer is being used in conjunction with the POS terminal at any given time. In addition, updates to expected, or new voltages, can be implemented via a firmware update. In other words, the firmware updates allow for new cash drawer and POS terminal interoperability without the need to redesign or replace physical hardware within the cash drawer or POS terminal.

The above discussion is intended to provide an overview of subject matter of the present patent application. It is not intended to provide an exclusive or exhaustive explanation of the invention. The description below is included to provide further information about the present patent application.

Figure 1A:
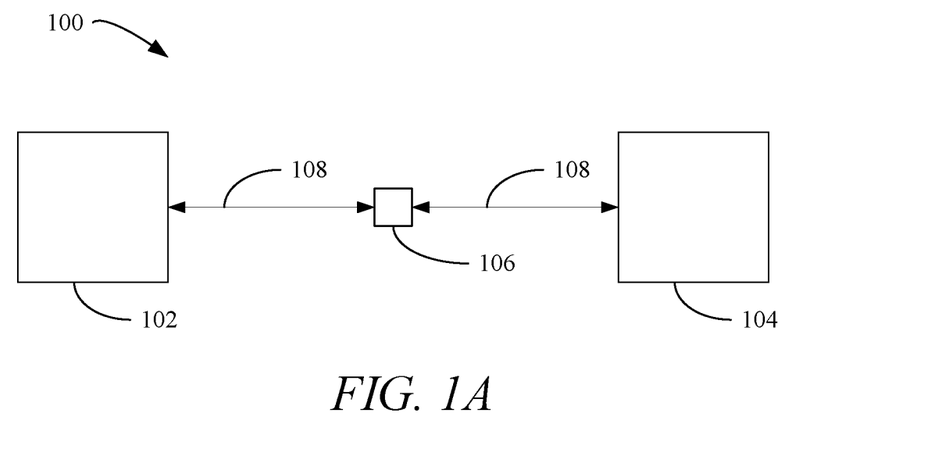
FIGS. 1A, 1B, and 1C each illustrates a system in accordance with at least one example of this disclosure.
Figure 1B:
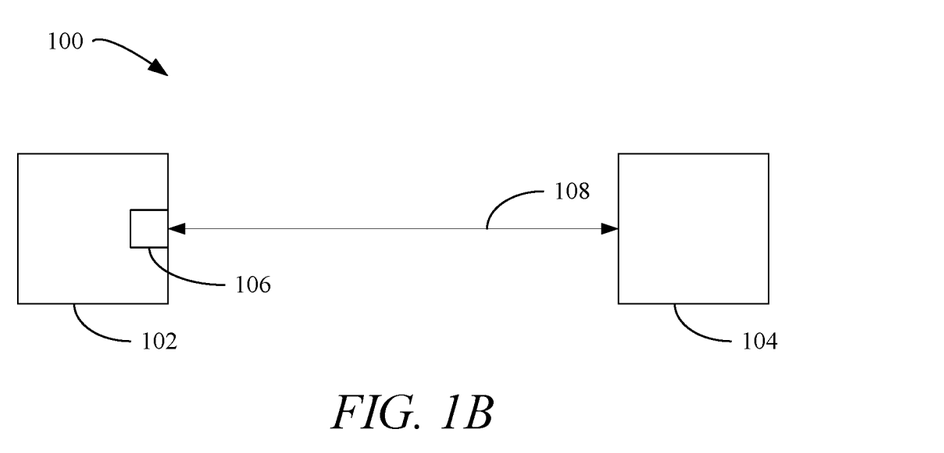
Figure 1C:
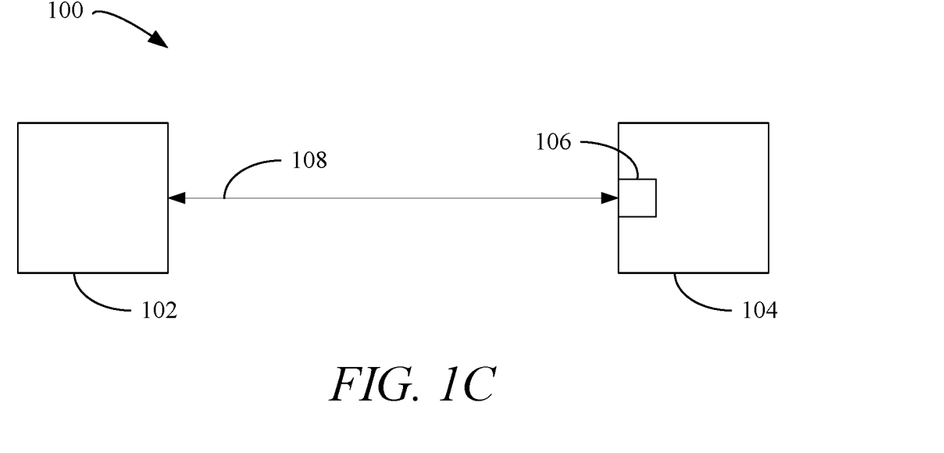

FIGS. 1A, 1B, and 1C each illustrate a system 100 in accordance with various examples of this disclosure. System 100 may include a point of sale (POS) terminal 102, a cash drawer 104, and an adaptor 108. POS terminal 102 may be connected to cash drawer 104 using a cable 108.

As disclosed herein, POS terminal 102 may be a legacy product that has fixed circuitry used to register and kick cash drawer 104. Cash drawer 104 may be a new design that is incompatible with the fixed circuitry of POS terminal 102. Cash drawer 104 may also be a legacy design, but simply have circuitry that is incompatible with the fixed circuitry of POS terminal 102.

As shown in FIG. 1A, adaptor 106 may be a standalone component. When adaptor 106 is a standalone component, multiple cables, such as cable 108 can be used to connect adaptor 106 to both cash drawer 104 and POS terminal 102. While FIG. 1A shows two cables 108 being used to connect adaptor 106 to POS terminal 102 and cash drawer 104, adaptor 106 can be connected directly to POS terminal 102 or cash drawer 104. For example, adaptor 106 can be connected directly to POS terminal 102 and cable 108 can connect adaptor 106 to cash drawer 104. Alternatively, adaptor 106 can be connected directly to cash drawer 104 and cable 108 can connect adaptor 106 to POS terminal 102.

As shown in FIG. 1B, adaptor 106 may be a component of POS terminal 102. For example, as new POS terminals are being manufactured, adaptor 106 may be incorporated in the POS terminals as disclosed herein. By incorporating adaptor 106 into new or refurbished POS terminals, the new or refurbished POS terminals may operate with legacy cash drawers as disclosed herein. When adaptor 106 is a component of POS terminal 102, adaptor 106 may be located within a housing of POS terminal 102 and connect directly to a motherboard of POS terminal 102. Cable 108 may connect direct to adaptor 106 and cash drawer 104.

As shown in FIG. 1C, adaptor 106 may be a component of cash drawer 104. For example, as new cash drawers are being manufactured, adaptor 106 may be incorporated in the cash drawers as disclosed herein. By incorporating adaptor 106 into new or refurbished cash drawers, the new or refurbished cash drawers may operate with legacy POS terminals as disclosed herein. When adaptor 106 is a component of cash drawer 104, adaptor 106 may be located within a housing of cash drawer 104. Cable 108 may connect direct to adaptor 106 and POS terminal 102.

Figure 2:
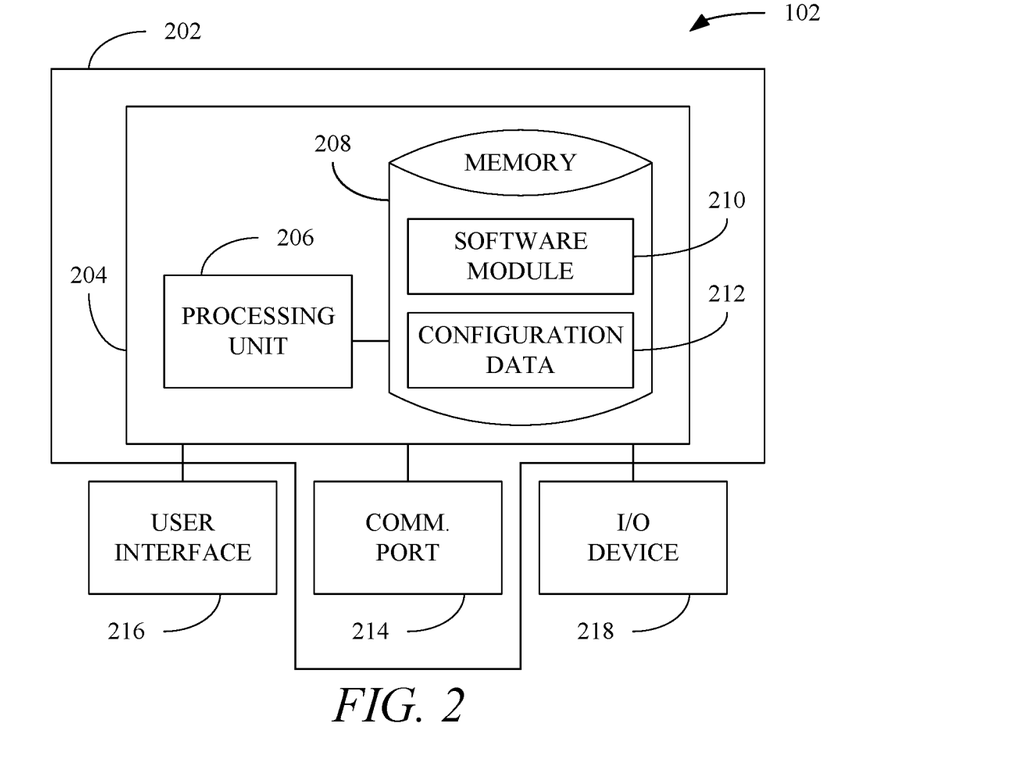
FIG. 2 illustrates a point of sale terminal in accordance with at least one example of this disclosure.

FIG. 2 illustrates POS terminal 102 in accordance with at least one example of this disclosure. POS terminal 102 may have a housing 202. Within the housing may be a motherboard 204. Connected to motherboard 204 may be a processor 206 and memory 208. Memory 208 may include a software module 210 and configuration data 212. While executing on processor 206, software module 208 may perform processes for completing transactions. For example, while executing on processor 206, software module 208 can issue commands to open cash drawer 104. In addition, software module 208 may monitor signals from adaptor 106 to monitor if cash drawer 104 is open or closed as disclosed herein.

Configuration data 212 may include operating parameters for POS terminal 102. For example, configuration data 212 may include model and configuration data for peripherals that may be connected to POS terminal 102. For example, configuration data 212 may include configuration data for scales, scanners, cash drawers, and other devices that may be connected to POS terminal 102.

POS terminal 102 may also include a communications port 214. Communications port 214 may allow POS terminal 102 to communicate with various items. For example, communications port 214 may be USB ports, RJXX connector types ports, etc. that can be used to connect items such as cash drawer 104, scales, printers, etc. to POS terminal 102. Communications port 214 can provide data connections, such as Ethernet connections (wired or wireless), Bluetooth connections, etc., with different systems. For example, communications port 214 can allow POS terminal 102 to communication with inventory management systems to track inventory as items are purchased, etc.

POS terminal 102 may also include a user interface 216. User interface 216 may act as a user interface that may include any number of devices that allow a user to interface with the POS terminal 102. User interface 216 may allow store personnel and/or customers to interact with POS terminal 102. For example, POS terminal 102 may be a terminal operated by store personnel in a traditional checkout lane. As such user interface 216 may allow store personnel to enter information, such as payment methods, etc. to facilitate a transaction. POS terminal 102 may also be a self-service terminal were the customer interacts with POS terminal 102 to enter various information to complete a transaction. User interface 216 may include a keypad, a display (touchscreen or otherwise), etc. In addition, user interface 216 may include audio equipment such as speakers, a microphone, a headphone jack, etc. that may be used to allow a customer or employee to interface with POS terminal 102.

POS terminal 102 may also include an input/output (I/O) device 218. I/O device 218 may allow POS terminal 102 to receive and output information. Non-limiting examples of I/O device 218 include, a camera (still or video), a printer, a scanner, biometric readers, etc. For example, I/O device 218 may include a camera or scanner that can be used to scan barcodes on items being purchased.

While not shown in FIG. 2, adaptor 106 may be included within housing 202 as described above with respect to FIG. 1B.

Figure 3:
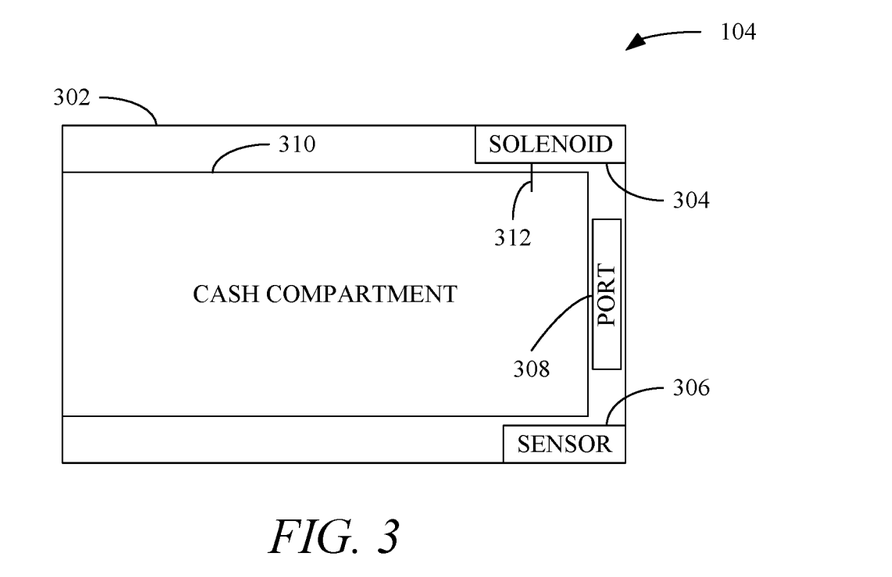
FIG. 3 illustrates a cash drawer in accordance with at least one example of this disclosure.

FIG. 3 illustrates cash drawer 104 in accordance with at least one example of this disclosure. Cash drawer 104 may include a housing 302. Located within housing 302 may be a solenoid 304, a sensor 306, a port 308, and a drawer 310. Solenoid 304 may include a pin 312. Pin 312 may engage drawer 310 so as to retain drawer 310 in housing 302 until such time as banknotes, cheques, or other media needs to be deposited into or removed from drawer 310. For example, upon receiving a signal from POS terminal 102, solenoid 304 can cause pin 312 to disengage drawer 310, which may in turn pop out of housing 302 to allow a cashier access to the contents of drawer 310.

Sensor 306 may be used to determine if drawer 310 is in an open or closed state. Non-limiting examples of sensor 306 include contact switches, proximity sensors, etc. For example, sensor 306 may be a contact switch and when drawer 310 is closed, the contact switch may be depressed. POS terminal 102 may interpret the depressed switch to indicate drawer 310 is closed.

Solenoid 304 and sensor 306 may be connected to POS terminal via port 308. Port 308 may provide for an electrical connection between cash drawer 104 and POS terminal 102 and/or adaptor 106. Non-limiting examples of port 308 can include a USB connection, a Molex connection, a serial port, a parallel port, or any combination thereof.

While not shown in FIG. 3, adaptor 106 may be included within housing 302 as described above with respect to FIG. 1C.

Figure 4:
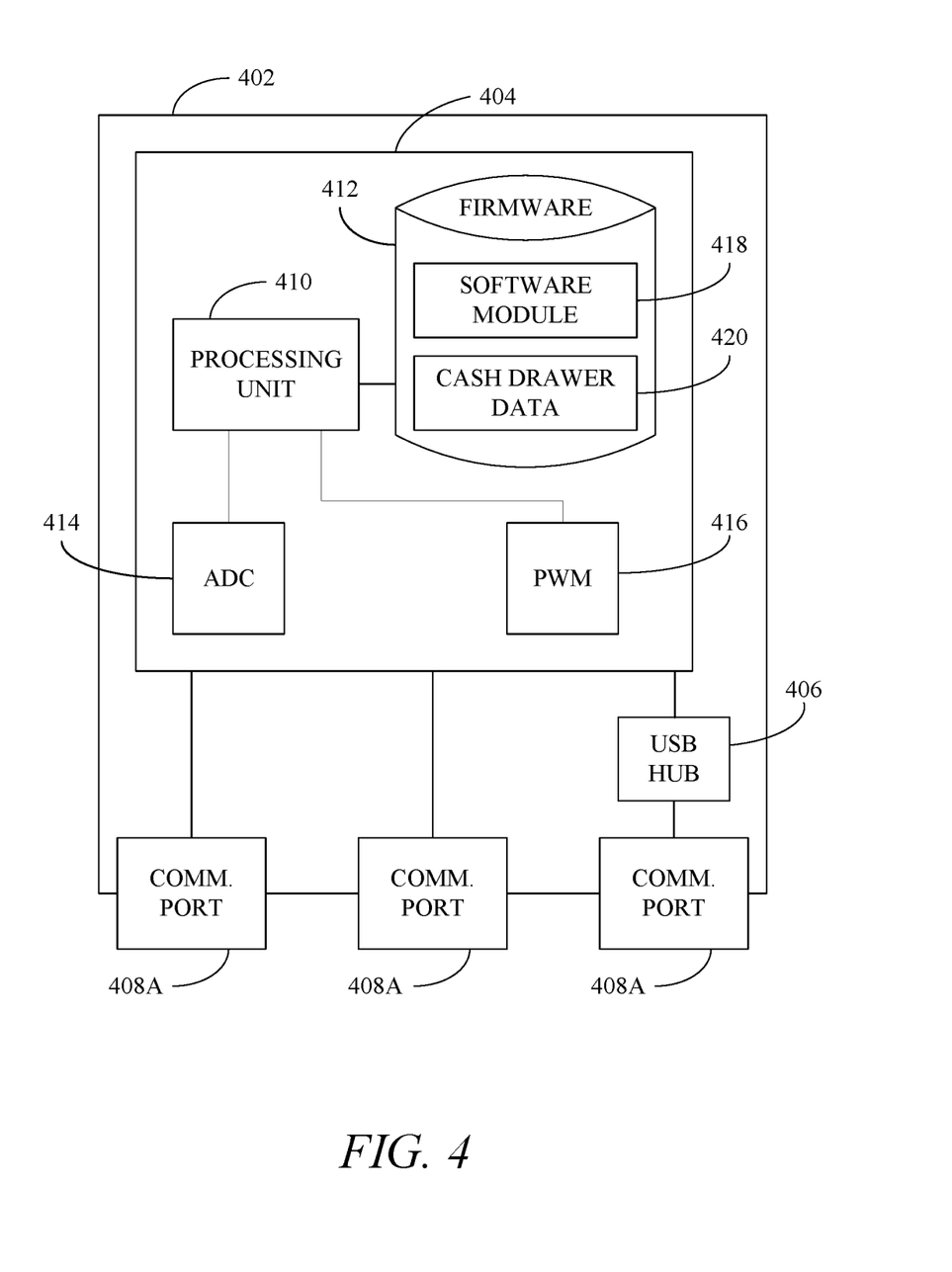
FIG. 4 illustrates an adaptor in accordance with at least one example of this disclosure.

FIG. 4 illustrates adaptor 106 in accordance with at least one example of this disclosure. Adaptor 106 may include an I/O board 402. Attached to the I/O board 402 may be a microcontroller 404, a universal serial bus (USB) hub 406, and communications ports 408 (labeled individually as 408A, 408B, and 408C). Microcontroller 404 may include a processor 410, firmware 412, an analog to digital converter (ADC) 414, and a pulse width modulator (PWM) 416. Firmware 412 may include a software module 418 and cash drawer data 420.

As disclosed herein, firmware 412 may be responsible for analyzing signals produced by cash drawer 104 to identify which type of cash drawer is connected, and to control the cash drawer when a request to open it has been transmitted by POS system 102. For example, cash drawer 104 may be 12 or 24 volt type cash drawers that can be connected to POS terminal 102. Type cash drawer means the voltage required to open or kick the cash drawer. The cash drawers may have different connecters that can be connected to communications ports 408. For example, communications ports 408A and 408B may be RJXX connector types. Adapter cables may be used when connecting to a POS system that either only has one port, or a specific port type. The introduction of adapter cables into cash drawer connections may generate different analog voltages than connecting them directly to I/O board 402. Because of this, firmware 412 may recognize different possible voltages. The different voltages associated with different cash drawer types may be stored as in cash drawer data 420. Firmware 412 may interpret the voltages and any other signals that may be received from cash drawer 104. For example, two cash drawers can be connected to adapter 106 via communications ports 408A and 408B or via an adaptor cable and then connected to I/O board 402 via a single port, such as communications port 408A or 408B. Because adaptor 106 is a separate component that can be connected to POS terminal 104 via USB connection via communications port 408C, future cash drawer configurations can be integrated and supported after production via an update to firmware 412. For example, when a new cash drawer is developed, firmware 412 can be flashed with new cash drawer data 420 to support the new cash drawer.

As disclosed herein, cash drawer data 420 can include a formula or lookup tables that can be used to identify a cash drawer type. For example, when connected to adapter 106, various pins and/or ports from cash drawer 104 may be used. Adapter 106 can determine which pins or ports are being used and may also receive a voltage from cash drawer 104. Microcontroller 404 can access a lookup table stored in cash drawer data 420 using pins or ports and voltage as inputs to determine the type of cash drawer 104.

Microcontroller 404 may receive data other than pins or ports and voltage as inputs. For example, cash drawer 104 may transmit a signal that includes data to microcontroller 404. The data may indicate a model number or other information that can be used to identify a type for cash drawer 104. Using the model number, microcontroller 404 may access cash drawer data 420 in firmware 412 to determine a voltage needed to open cash drawer 104. For example, using the model number, microcontroller 404 may access cash drawer data 420 and retrieve a numerical value for a voltage needed to actuate solenoid 304.

Consistent with embodiments disclosed herein, microcontroller 404 may alter a signal using PWM 416. For example, the PWM signal's pulse width may be altered to allow a cash drawer of any operational voltage within a maximum voltage supported by POS terminal 102 and/or adaptor 106 to be controlled. By using PWM 416 cash drawers with voltages other than standard voltages, such as 12 or 24 volts, that may be supported by legacy POS terminals can be used with only minor changes such as updating firmware 412.

Legacy systems with two physical cash drawer ports and using additional cables (y-cables or direct adapters) with fixed circuitry can only detect and support 16 different combinations of cash drawers and cables. Using adaptor 106 any number of different configurations to be detected and supported without requiring any hardware modification. Instead, only firmware 412 needs to be updated to accommodate new or different cash drawers not supported by legacy POS systems and fixed circuitry. This highly reduces the ability for customers to connect cash drawers incorrectly and potentially encounter issues.

Adaptor 106 also allows for the dynamic detection of cash drawer operational voltages and allows for the proper voltage for the cash drawer targeted during the open request to be set. This enables 12 and 24-volt cash drawers to be connected at the same time, which is not possible with the fixed circuitry found in legacy devices. The dynamic detection is accomplished by adaptor 106 receiving signals having information about cash drawer 104 from cash drawer 104 and using the information to select a voltage for opening cash drawer.

Firmware 412 can utilize ADC 414 to detect whether adapter cables are used and detect cash drawers connected incorrectly. ADC 414 allows microcontroller 404 to provide finer level of granularity in voltage detection, which allows support for cash drawer connections that could never be supported by legacy circuitry. For example, legacy circuitry using discrete comparators can only compare/detect the specific voltage for which it was designed. ADC 414 on the other hand can measure and detect hundreds or more different voltage levels. For instance, a low voltage detected could indicate one type of drawer (e.g., a 12V one), a high voltage detected could indicate another type of drawer (e.g., a 24V one), while voltages in the middle could indicate a new, different types of drawer (e.g., a 5V, 9V, 18V, etc.).

Using USB hub 406 and communications port 408A can allow adaptor 106 to be connected to POS terminal 102 via a USB connection. In addition, USB hub 406 and communications port 408A can allow adaptor 106 to be connected to any computing device so as to allow firmware 412 to be updated so as to accommodate new cash drawers or POS terminals. For example, cash drawers could be enumerated in look tables and cash drawer data 420 updated whenever new cash drawer parameters are released. This can also allow cash drawer interfaces to vary and updated as new standardized interfaces for cash drawers are developed and publicly released.

Figure 5:
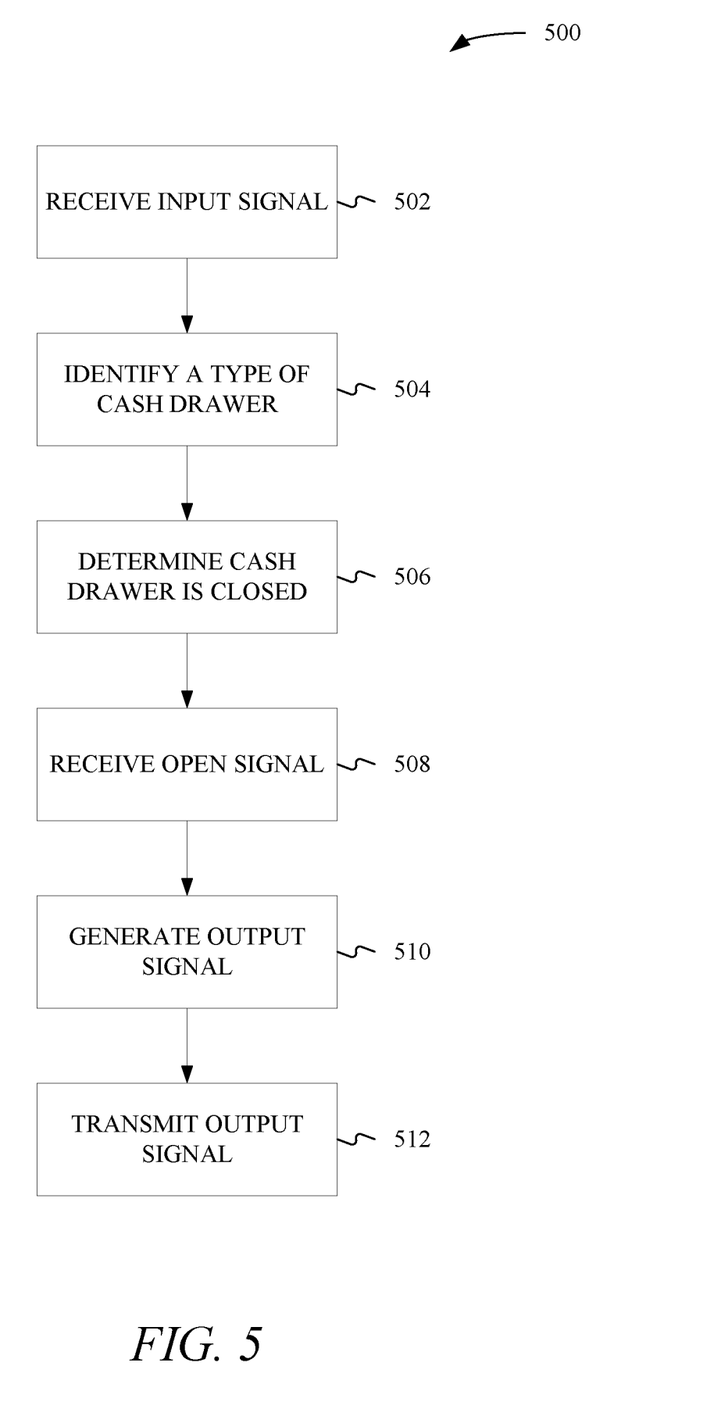
FIG. 5 illustrates a method in accordance with at least one example of this disclosure.

FIG. 5 illustrates a method 500 in accordance with at least one example of this disclosure. Method 500 may be for connecting cash drawer 104 to POS 102 and opening cash drawer 104 using adaptor 106.

During operation POS terminal 102 may send a command to microcontroller 404 to open one of two cash drawers, such as cash drawer 104, via USB hub 406 and communications port 408C. Microcontroller 404 may receive an input signal from cash drawer (502). For example, microcontroller 404 may transmit a signal to cash drawer 104 and receive a return signal that acts as the input signal. Using the input signal, microcontroller 404 may identify a type for cash drawer 104 (504). For instance, microcontroller 404 may measure a coil resistance for solenoid 304 using ADC 414 to determine cash drawer operating voltage and cable/drawer configuration.

Once the type (e.g., 12 or 24 volts) for cash drawer 104 is identified, the microcontroller 404 can utilize firmware 412 configure adaptor 106 to deliver the appropriate voltage solenoid 304 requires to open cash drawer 104.

Before cash drawer 104 can be opened, microcontroller 404 or POS terminal 102 may need to know if cash drawer 104 is already open. As a result, either microcontroller 404 or POS terminal 102 can determine if cash drawer 104 is open or closed (506). To determine if cash drawer 104 is open microcontroller 404 and/or POS terminal 102 may receive a signal from sensor 306. The signal may be a voltage or the lack of a voltage. For example, when cash compartment 310 is inside housing 302, sensor 306, which may be a normally open contact switch, may be closed and allow a voltage to travel from cash drawer 104 to microcontroller 404 or POS terminal 102. When cash compartment 310 is inside housing 302, sensor 306, which may be a normally closed contact switch, may be open and interrupt or otherwise prevent a voltage to travel from cash drawer 104 to microcontroller 404 or POS terminal 102. The presence or lack of a signal can be interpreted by microcontroller 404 or POS terminal 102 as cash drawer 104 being closed or open.

After a transaction is complete, cash drawer 104 may need to be opened so that banknotes, cheques, or other media can be deposited and/or retrieved from cash compartment 310. To open cash drawer 104 POS terminal 102 may transmit an open signal that may be received by adaptor 106 (508).

After receiving the open signal, microcontroller 404 may generate an output signal (510) and transmit the output signal to cash drawer 104 (512). For example, microcontroller 404 may open the cash drawer by generating and transmitting a cash drawer kick signal (i.e., the output signal) to the coil of solenoid 306 to kick cash drawer 104. The kick signal may have the appropriate duty cycle to create the cash drawer operating voltage identified when the type of cash drawer was identified in stage 504. The kick signal transmitted to cash drawer 104 may cause the cash drawer to open so that media can be deposited or retrieved from cash compartment 310.

One skilled in the art will realize in view of this disclosure that the various stages of method 500 may be reordered and/or omitted without departing from the spirit of this disclosure. For example, microcontroller 404 may continuously measure the cash drawer switch state (e.g., sensor 306) using ADC 414. For instance, microcontroller 404 may receive an analog signal from sensor 306 and convert the signal to a digital signal that is used by microcontroller 404 and/or POS terminal 102 to monitor the open/closed status of cash drawer 104. Microcontroller 404 may send a status result back to POS terminal 102 via communications port 408B. The monitoring of the open/closed status of cash drawer 104 may be eliminated from method 500 without departing from the spirit of this disclosure.

The systems and methods disclosed herein allow a significantly higher range of cash drawer configurations to be supported and automatically detected, reducing potential error in connecting cash drawers, which is quite possible due to the amount of cash drawer and cables models available for sale. The systems and methods disclosed herein also allow upgrading of infrastructure without having to completely abandon legacy systems to keep using any cash drawers operators may already have and that are still functional with new platforms. Furthermore, future cash drawers that are not compatible with legacy circuitry and voltages can be added via firmware update.

EXAMPLES

Example 1 is an adaptor for connecting a cash drawer to a point of sale (POS) terminal, the adaptor comprising: a processor; and a memory storing instructions that, when executed by the processor, cause the adaptor to perform actions comprising: receiving, from the cash drawer, an input signal, identifying a type of the cash drawer based on the input signal, generating an output signal operative to open the cash drawer, and transmitting the output signal to the cash drawer.

In Example 2, the subject matter of Example 1 optionally includes wherein generating the output signal includes: referencing a lookup table containing a plurality of second voltages; and selecting, from the lookup table, the second voltage based on the type of the cash drawer.

In Example 3, the subject matter of any one or more of Examples 1-2 optionally include wherein the input signal includes a first voltage.

In Example 4, the subject matter of any one or more of Examples 1-3 optionally include wherein the actions further comprise converting the input signal from an analog signal to a digital signal.

In Example 5, the subject matter of any one or more of Examples 1-4 optionally include wherein generating the output signal includes altering a pulse width of the output signal.

In Example 6, the subject matter of any one or more of Examples 1-5 optionally include wherein the actions further comprise determining if the cash drawer is open or closed.

In Example 7, the subject matter of any one or more of Examples 1-6 optionally include wherein the output signal includes a second voltage.

In Example 8, the subject matter of Example 7 optionally includes wherein the second voltage has a range of about 5 volts to about 24 volts.

In Example 9, the subject matter of any one or more of Examples 1-8 optionally include wherein the adaptor is a component of the cash drawer.

Example 10 is a point of sale (POS) terminal comprising: a cash drawer port; a motherboard; and a microcontroller electrically coupled to the cash drawer port and the motherboard, the microcontroller operative to perform actions comprising: receiving an input signal from a cash drawer via the cash drawer port, identifying a type of the cash drawer based on the input signal, receiving an open signal from the motherboard, generating an output signal operative to open the cash drawer after receiving the open signal, and transmitting the output signal to the cash drawer via the cash drawer port.

In Example 11, the subject matter of Example 10 optionally includes wherein the microcontroller further comprises an analog/digital converter (ADC), and wherein the actions further comprise converting the input signal from an analog signal to a digital signal using the ADC.

In Example 12, the subject matter of any one or more of Examples 10-11 optionally include wherein the microcontroller further comprises a pulse width modulator (PWM), and wherein generating the output signal includes altering a pulse width of the output signal via the PWM.

In Example 13, the subject matter of any one or more of Examples 10-12 optionally include wherein the actions further comprise determining if the cash drawer is open or closed.

In Example 14, the subject matter of any one or more of Examples 10-13 optionally include wherein generating the output signal includes: referencing a lookup table containing a plurality of second voltages; and selecting, from the lookup table, the second voltage based on the type of the cash drawer.

In Example 15, the subject matter of any one or more of Examples 10-14 optionally include wherein the open signal is a data signal.

Example 16 is a system comprising: a cash drawer having a type and including a solenoid; a point of sale (POS)

terminal; and an adaptor in electrical communication with the cash drawer and the POS terminal, the adaptor operative to perform actions comprising: receiving an input signal from the cash drawer, identifying the type of the cash drawer based on the input signal, generating an output signal operative to active the solenoid of the cash drawer, and transmitting the output signal to the solenoid of the cash drawer.

In Example 17, the subject matter of Example 16 optionally includes wherein the actions further comprise converting the input signal from an analog signal to a digital signal.

In Example 18, the subject matter of any one or more of Examples 16-17 optionally include wherein the second voltage has a range of about 5 volts to about 24 volts.

In Example 19, the subject matter of any one or more of Examples 16-18 optionally include wherein the actions further comprise determining if the cash drawer is open or closed.

In Example 20, the subject matter of any one or more of Examples 16-19 optionally include wherein the adaptor is located in a housing of the POS terminal and attached to a motherboard of the POS terminal.

In Example 21, the adaptors, cash drawers, POS terminals, or use thereof of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An adaptor for connecting a cash drawer to a point of sale (POS) terminal, the adaptor comprising:
   a processor; and
   a memory storing instructions that, when executed by the processor, cause the adaptor to perform actions comprising:
      receiving, from the cash drawer, an input signal,
      identifying a type of the cash drawer based on the input signal,
      generating an output signal operative to open the cash drawer, and
      transmitting the output signal to the cash drawer,
   wherein the adaptor is located in a housing of the POS terminal and attached to a motherboard of the POS terminal.

2. The adaptor of claim 1, wherein generating the output signal includes:
   referencing a lookup table containing a plurality of second voltages; and
   selecting, from the lookup table, the second voltage based on the type of the cash drawer.

3. The adaptor of claim 1, wherein the input signal includes a first voltage.

4. The adaptor of claim 1, wherein the actions further comprise converting the input signal from an analog signal to a digital signal.

5. The adaptor of claim 1, wherein generating the output signal includes altering a pulse width of the output signal.

6. The adaptor of claim 1, wherein the actions further comprise determining if the cash drawer is open or closed.

7. The adaptor of claim 1, wherein the output signal includes a second voltage.

8. The adaptor of claim 7, wherein the second voltage has a range of about 5 volts to about 24 volts.

9. A point of sale (POS) terminal comprising:
   a cash drawer port;
   a motherboard;
   a housing attached to the motherboard; and
   an adaptor located in the housing, the adaptor comprising:
      a microcontroller electrically coupled to the cash drawer port and the motherboard, the microcontroller operative to perform actions comprising:
         receiving an input signal from a cash drawer via the cash drawer port,
         identifying a type of the cash drawer based on the input signal,
         receiving an open signal from the motherboard, generating an output signal operative to open the cash drawer after receiving the open signal, and transmitting the output signal to the cash drawer via the cash drawer port.

10. The POS terminal of claim 9,
wherein the microcontroller further comprises an analog/digital convert (ADC), and
wherein the actions further comprise converting the input signal from an analog signal to a digital signal using the ADC.

11. The POS terminal of claim 9,
wherein the microcontroller further comprises a pulse width modulator (PWM), and
wherein generating the output signal includes altering a pulse width of the output signal via the PWM.

12. The POS terminal of claim 9, wherein the actions further comprise determining if the cash drawer is open or closed.

13. The POS terminal of claim 9, wherein generating the output signal includes:
referencing a lookup table containing a plurality of second voltages; and
selecting, from the lookup table, the second voltage based on the type of the cash drawer.

14. The POS terminal of claim 9, wherein the open signal is a data signal.

15. A system comprising:
a cash drawer having a type and including a solenoid;
a point of sale (POS) terminal; and
an adaptor in electrical communication with the cash drawer and the POS terminal, the adaptor operative to perform actions comprising:
receiving an input signal from the cash drawer,
identifying the type of the cash drawer based on the input signal,
generating an output signal operative to active the solenoid of the cash drawer, and
transmitting the output signal to the solenoid of the cash drawer,
wherein the adaptor is located in a housing of the POS terminal and attached to a motherboard of the POS terminal.

16. The system of claim 15, wherein the actions further comprise converting the input signal from an analog signal to a digital signal.

17. The system of claim 15, wherein the input signal is a data signal and the output signal is a voltage with a range of about 5 volts to about 24 volts.

18. The system of claim 15, wherein the actions further comprise determining if the cash drawer is open or closed.

* * * * *